May 4, 1965

W. C. BROWN 3,182,318

RADAR SYSTEM AND METHOD FOR DETERMINING THE POINT OF BURST OF A PROJECTILE

Filed April 1, 1963

Inventor
William C. Brown
By Cushman, Darby & Cushman
Attorneys

May 4, 1965 W. C. BROWN 3,182,318

RADAR SYSTEM AND METHOD FOR DETERMINING THE POINT OF BURST OF A PROJECTILE

Filed April 1, 1963

Inventor
William C. Brown
By Cushman, Darby & Cushman
Attorneys

May 4, 1965 W. C. BROWN 3,182,318
RADAR SYSTEM AND METHOD FOR DETERMINING THE POINT OF BURST OF A PROJECTILE
Filed April 1, 1963 12 Sheets-Sheet 3
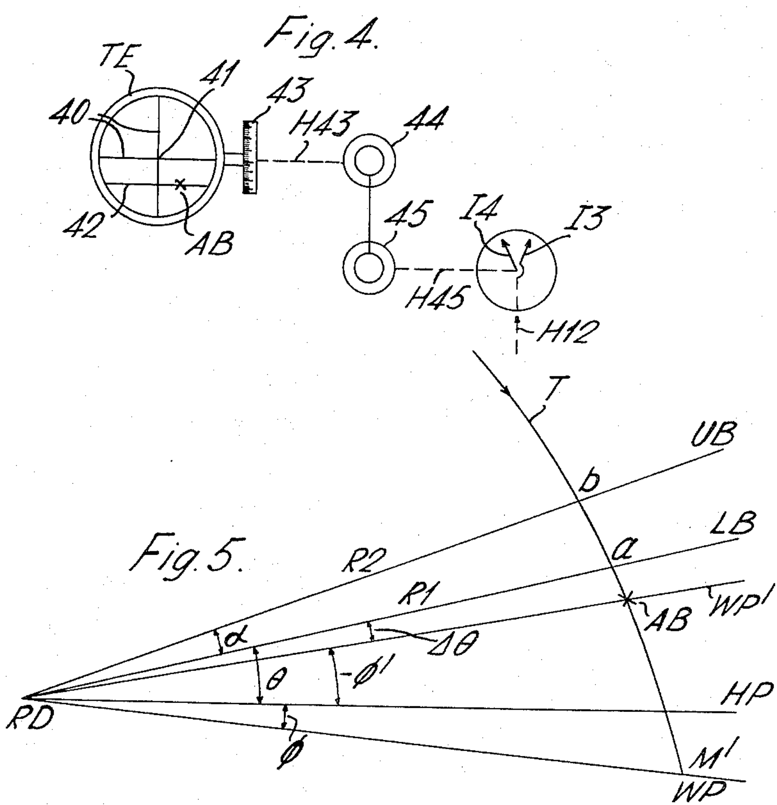
William C. Brown
Inventor
By Cushman, Darby & Cushman
Attorneys

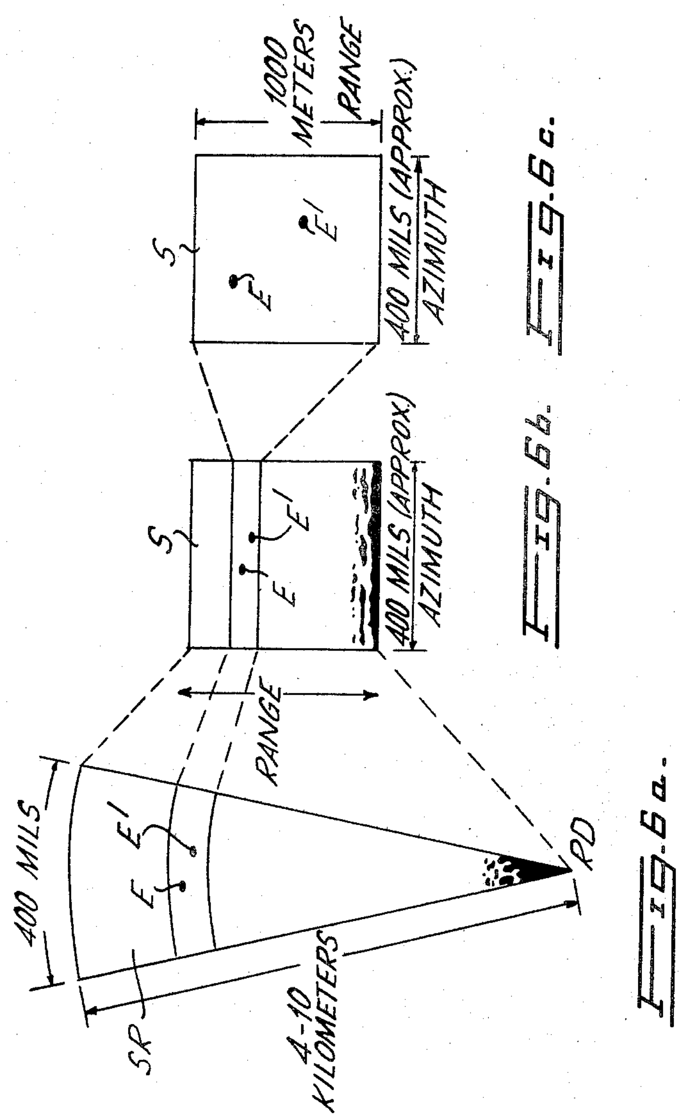
Inventor
William C. Brown
By Cushman, Darby & Cushman
Attorneys

Inventor
William C. Brown
By Cushman, Darby & Cushman
Attorneys

Inventor
William C. Brown
By Cushman, Darby & Cushman
Attorneys

William C. Brown, Inventor
By Cushman, Darby & Cushman, Attorneys

William C. Brown
Inventor
By Cushman, Darby & Cushman
Attorneys

Inventor
William C. Brown
By Cushman, Darby & Cushman
Attorneys

William C. Brown
Inventor
By Cushman, Darby & Cushman
Attorneys

William C. Brown, Inventor
By Cushman, Darby & Cushman, Attorneys

William C. Brown
Inventor
By Cushman, Darby & Cushman
Attorneys

United States Patent Office 3,182,318

Patented May 4, 1965

3,182,318

RADAR SYSTEM AND METHOD FOR DETERMINING THE POINT OF BURST OF A PROJECTILE

William C. Brown, Ottawa, Ontario, Canada, assignor to National Research Council, Ottawa, Ontario, Canada, a body corporate of Canada Filed Apr. 1, 1963, Ser. No. 269,285
Claims priority, application Canada, Jan. 23, 1963, 867,187
8 Claims. (Cl. 343—7)

This invention relates to a radar system and method, for use in obtaining echoes from projectiles, for the purpose of determining accurately the trajectory of such projectiles and the location of points thereon.

Although the invention may, and generally will, be incorporated in a radar system designed primarily for locating enemy weapons by obtaining echoes from projectiles fired by such weapons, the present invention is itself concerned solely with the radar observance of projectiles fired by friendly guns.

Before being able accurately to hit a target at a designated map reference it is necessary for gunners to follow a procedure known as "registration of fire." This procedure constitutes the calibration of each weapon to take into account various factors such as barrel wear and other aging of the weapon parts, as well as meteorological conditions. Effective registration of fire in the traditional manner involves the need for two or more forward observation posts. Trial rounds are fired; the fall of shot is observed from the observation posts; and fixes are obtained on such positions. This information is then transmitted to the guns for the necessary corrections to be made. Many rounds and valuable time are lost in this way.

The present invention is concerned with a radar system which greatly accelerates this procedure as well as providing accurate information and avoiding the need for forward observation posts. The invention provides means for obtaining an accurate fix on the point of burst of a projectile which has been fused for bursting within observable range of a telescope mounted on the radar system. This is normally best achieved by fusing the projectile to burst in the air above the ground. Such air bursts can be comparatively readily observed from a substantial distance, without impediment by ground objects or variations in ground level. However, it will be assumed in the description which follows that fusing for air burst is the method adopted, since it is of universal applicability.

United States patent application of William C. Brown et al. Serial No. 269,367 filed April 1, 1963 describes a basic radar system for the observance of enemy projectiles. United States patent application of Charles R. Clemence et al. Serial No. 269,284 filed April 1, 1963 describes a refinement of this system in which a similar radar system is employed both to watch enemy projectiles and to observe friendly projectiles aimed at the enemy weapon. In this way it is possible to determine where the friendly projectiles are falling in relation to the position of the enemy weapon as calculated from observance of the trajectories of its own projectiles. It will be appreciated that the enemy weapon itself will normally be hidden from direct visual or radar observation.

The present invention is concerned with those aspects of a radar system provided for watching solely friendly projectiles, for the purpose of "registering" the friendly guns. Nevertheless, for the purposes of the description which follows, it has been assumed that the features of the present invention are incorporated into a radar system similar to that described in such prior application No. 269,367. Such a system provides radar means for determining at least two points (intercepts) through which a projectile passes, and a computer for calculating from such intercepts the point of intersection of the trajectory of the projectile with a working plane. The working plane is defined as the one including the line between the radar system and the target point and all horizontal lines perpendicular to said line. The target point is thus the point of intersection of the projectile trajectory with the working plane. When the radar system is concerned with locating an enemy weapon on the ground or with locating the position of the fall of friendly shot on the ground, the angle of the working plane will be chosen to give a ground location for the target point. When the target point is above the ground, as is the case when locating the position of an air burst, the working plane is correspondingly modified to pass through both the radar system and such elevated target point. When desired for greater accuracy, the time interval required for passage of the projectile between a selected two intercepts is also inserted into the computer.

To this end, the radar system of the invention comprises (*a*) Means for emitting two closely vertically superposed, mutually divergent, generally horizontal, effectively continuous, upper and lower radar beams, (*b*) Means for displaying echoes returned by a projectile travelling in a trajectory intersecting said upper and lower beams and for determining range and azimuth values of such intersections measured from the radar system in relation to a known azimuth datum, (*c*) A computer, (*d*) Means for supplying the computer with said determined range and azimuth values, with the value of the angle ($\theta$) the lower beam makes with the horizontal, with the value of the angle ($\alpha$) between beams and with the value of the angle ($\phi$) a working plane makes with the horizontal, (*e*) Said computer including means for calculating at least approximately coordinates of a target point on said working plane through which such trajectory extends, (*f*) And means for observing the point of burst of a projectile and for setting the computer for a working plane passing through such observed point of burst.

The invention also has a method aspect which can be defined in its broad scope as (*a*) Emitting from a radar system two closely vertically superposed, mutually divergent, generally horizontal, effectively continuous, upper and lower radar beams to intersect the trajectory of said projectile, the lower beam lying above said point of burst, (*b*) Determining the angle ($\theta$) the lower beam makes with the horizontal, and the angle ($\alpha$) between the upper and lower beams, (*c*) Observing the point of burst and determining the angle ($\Delta\theta$) that a working plane extending from the radar system through said point of burst makes with the lower beam, (*d*) Determining the angle ($\phi$) made with the horizontal by the working plane from the equation $\phi=\theta-\Delta\theta$, (*e*) Displaying on a range-azimuth radar display echoes returned by said projectile during intersection of said upper and lower beams, (*f*) And employing the differences in range and azimuth of the intersections so displayed, together with the values of said angles, to determine coordinates of the point of burst.

Details of the extrapolation equations employed and their manner of solution appear from the specific description that follows which, together with the accompanying drawings, illustrates two manners in which the invention may be carried into practice. It is to be understood that the radar system specifically illustrated in the drawings and the method of operation described in relation thereto is furnished by way of example of the invention only, the broad scope of the invention being limited only by the appended claims.

In the drawings:

FIGURE 1 is a general perspective view of a radar system according to the invention in operation, FIGURE 2 is a perspective view on a larger scale of the antenna assembly, FIGURE 3 is a rear view of the antenna assembly of FIGURE 2, FIGURE 4 is a fragmentary diagram showing the connection of a telescope on the antenna assembly to the computer, FIGURE 5 is a diagram of a typical trajectory of a projectile fused for air burst.

FIGURE 6*a* is a plan view of the area scanned by the radar system,

FIGURE 6*b* demonstrates the manner of presenting such area of scan (FIGURE 6*a*) on a radar B-scope during a long range searching sweep, FIGURE 6*c* shows a portion of the presentation of FIGURE 6*b* enlarged as it appears for a short range sweep, FIGURE 7*a* is a simplified front view of a portion of a radar control panel illustrating diagrammatically the appearance of an echo of a projectile on the screen, FIGURE 7*b* is another view similar to FIGURE 7*a*, a short time later in operation, FIGURE 7*c* is yet another view similar to FIGURES 7*a* and 7*b* at a later stage, FIGURE 7*d* is another similar view at yet a later stage in the radar observance of the projectile, FIGURE 7*e* is a view similar to FIGURES 7*a* to *d* showing the marks made by the operator which remain after the projectile echoes have faded, and a manner of use of a marker spot.

FIGURE 7*f* is a view similar to FIGURE 7*e* at a later stage in operation,

Figure 8:
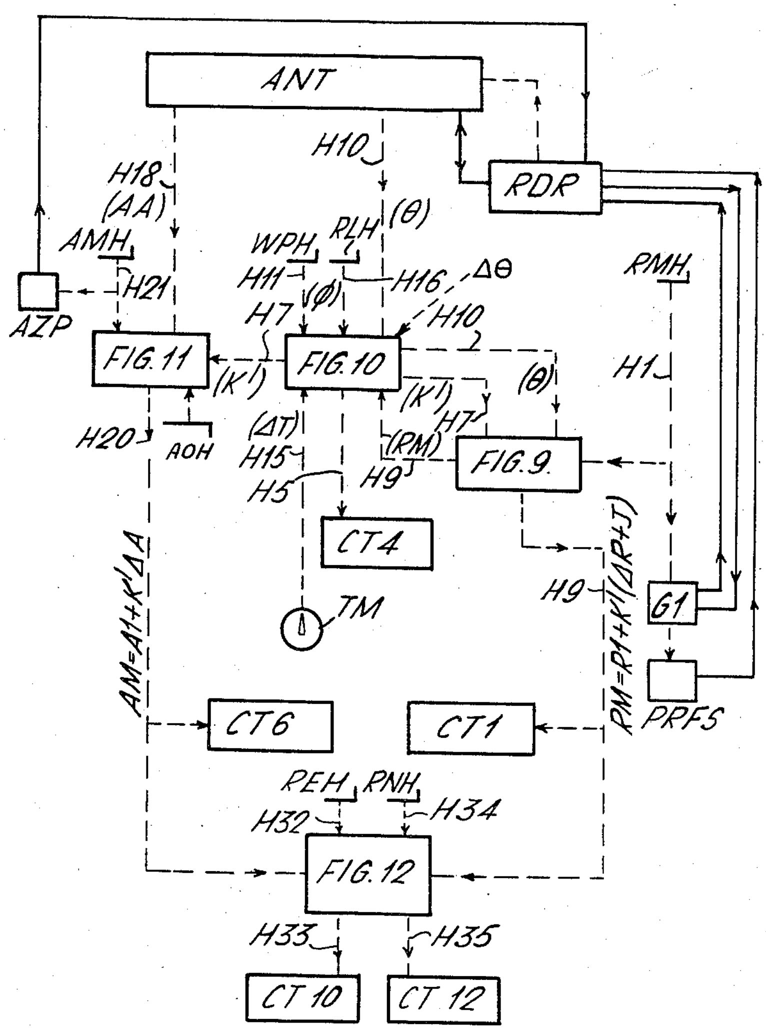
FIGURE 8 is a general overall circuit for the radar system.
Figure 10:
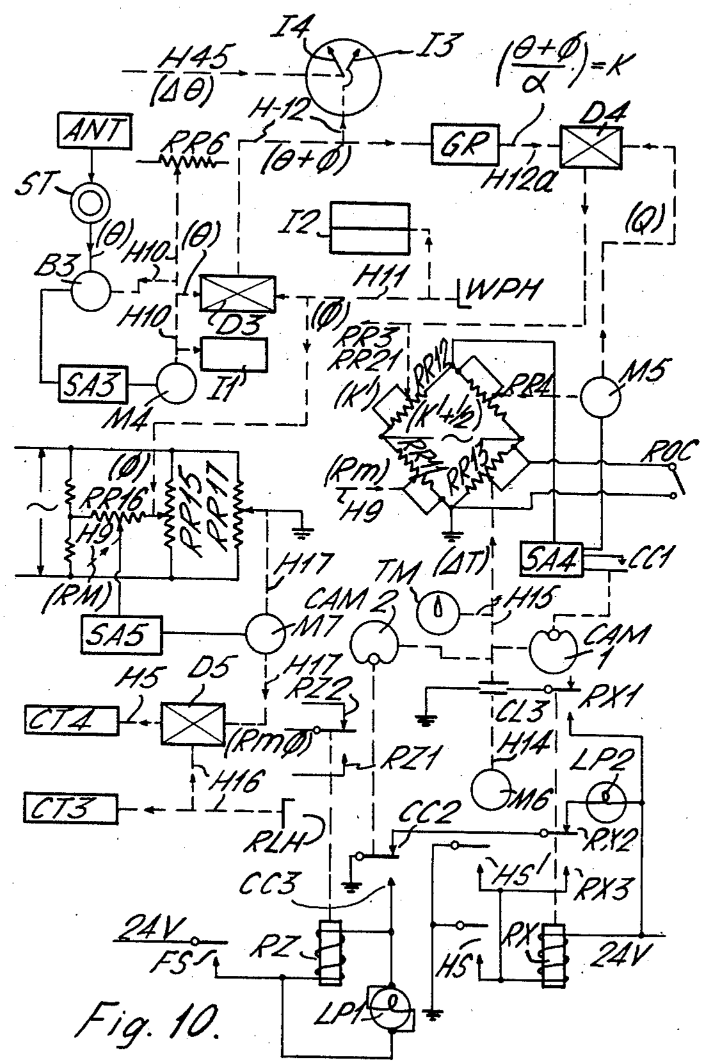
Figure 10A:
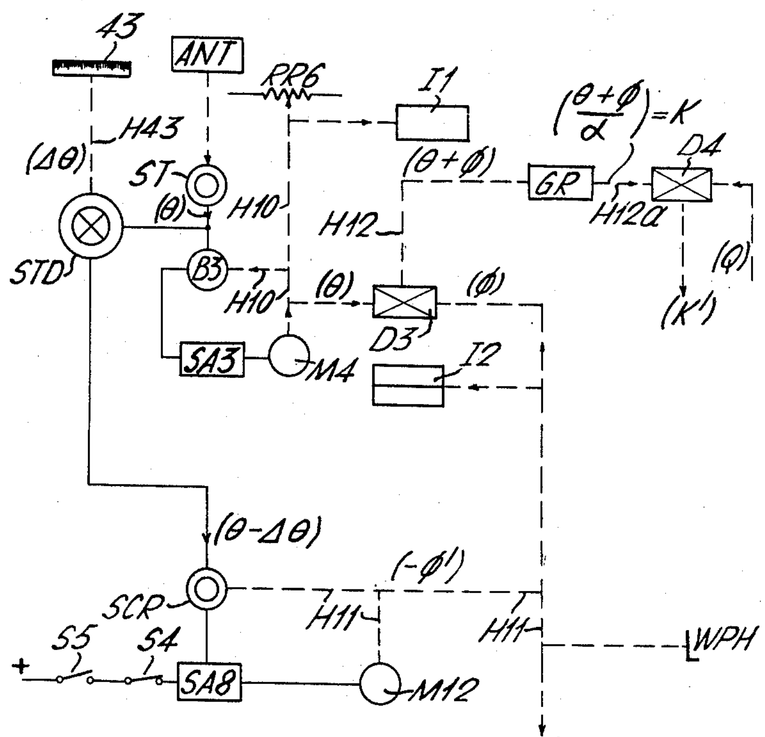
Figure 11:
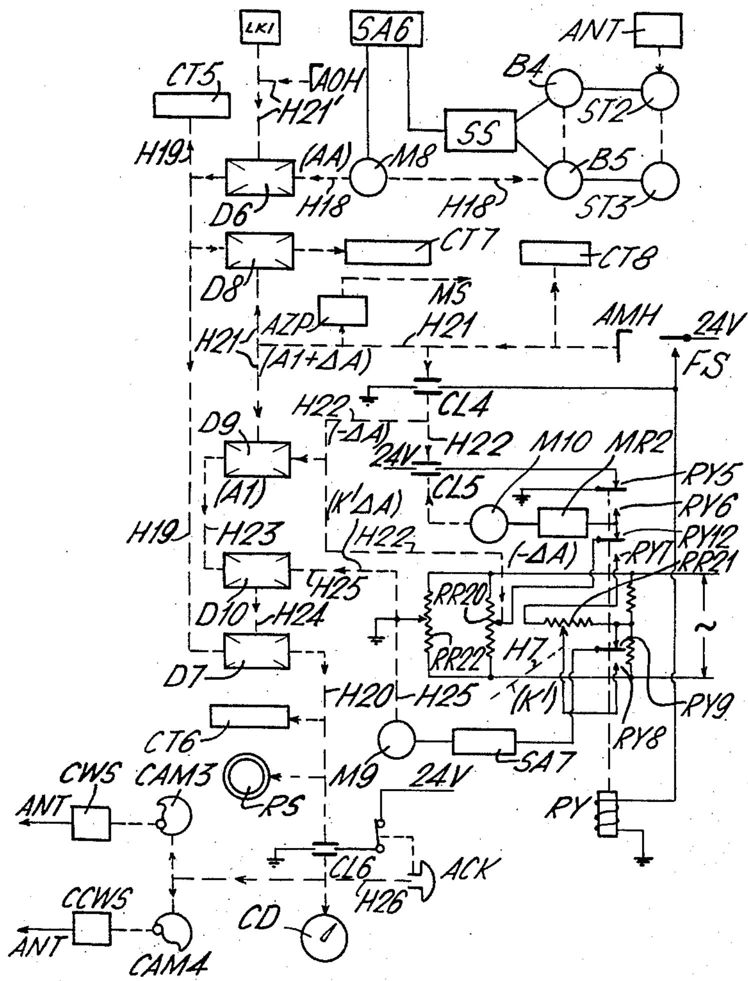
Figure 12:
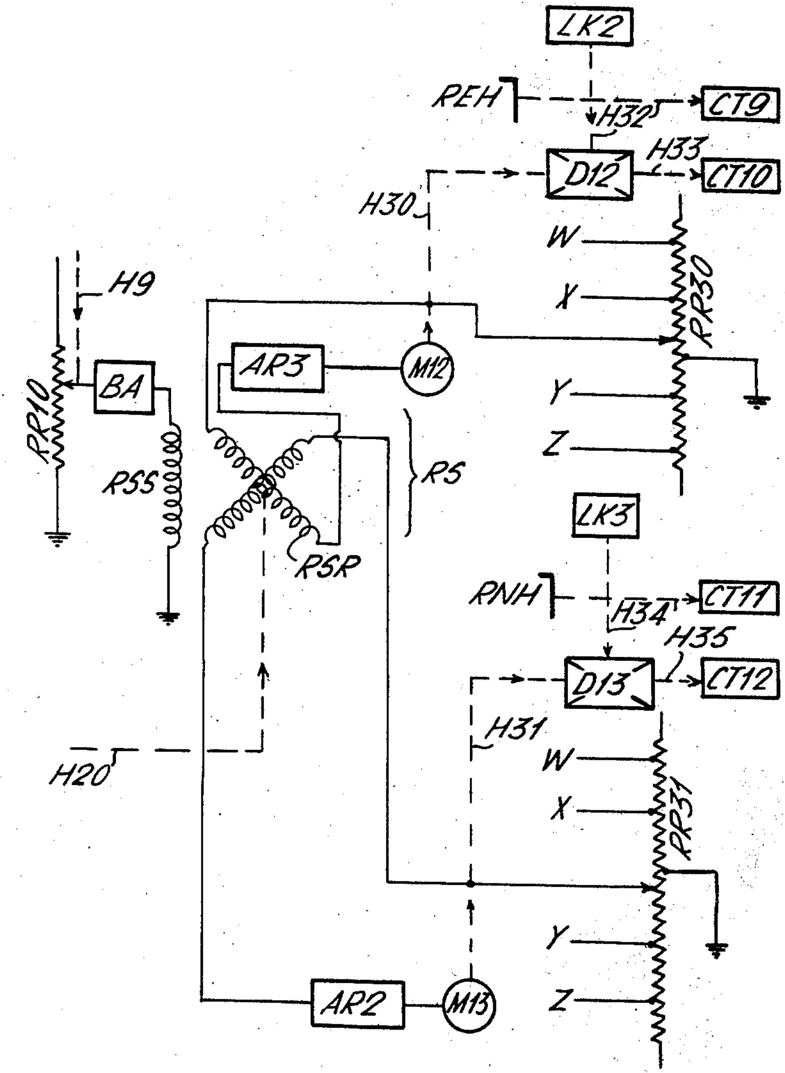

FIGURE 10 is a more detailed illustration of the portion of the circuit of FIGURE 8 principally concerned with calculating the elevation of the target point and providing certain parameters to the range and azimuth circuit portions, FIGURE 10*a* is a fragment of FIGURE 10 showing a modification thereto, FIGURE 11 is a more detailed illustration of another portion of the circuit of FIGURE 8 principally concerned with calculating the azimuth of the target point and providing certain parameters to the range and elevation circuit portions, FIGURE 12 is a detailed illustration of the portion of the circuit provided to display the information in the most conveniently usable form.

*Overall system (FIGURE 1)*

Figure 1:
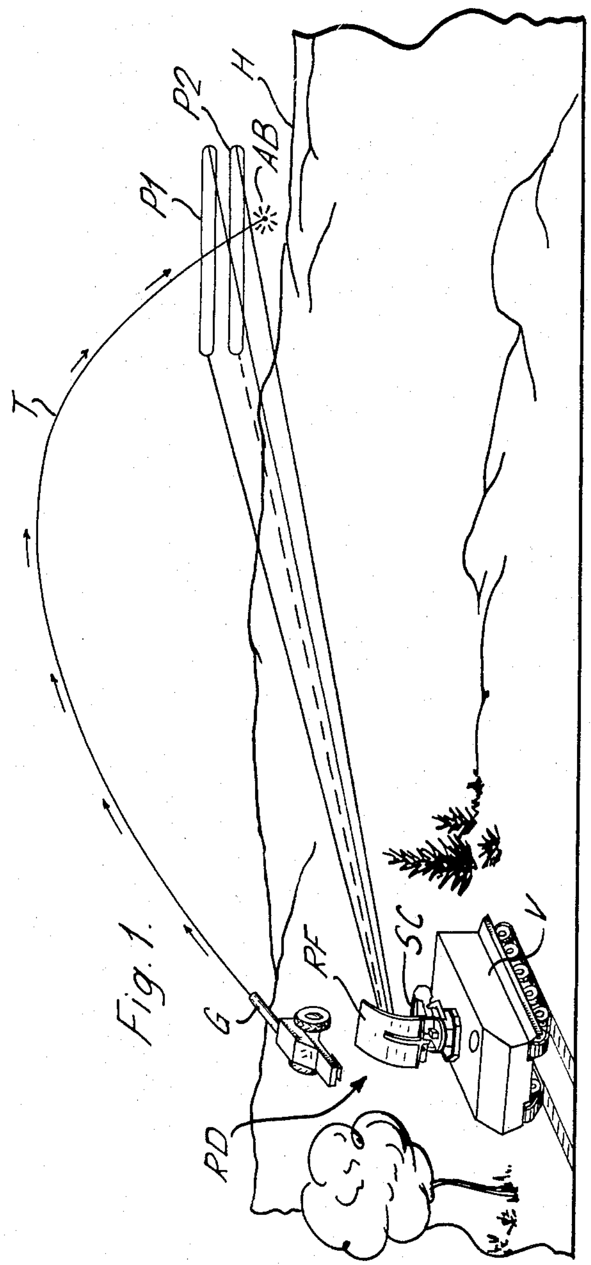

FIGURE 1 shows the radar system RD mounted on a vehicle V being used to observe the trajectory T of a projectile fired by a friendly gun G. The area towards which the gun is firing is behind a row of hills H, so that the ground level at such location is not visible. The projectile will be fused for air burst at a certain height above the ground, which will be position AB. It is the coordinates of this point AB that the gunners wish to know to adjust their guns. The antenna assembly of the radar system RD provides a narrow beam substantially circular in cross-section having a width of approximately 16 mils in both directions. The system causes this narrow beam to scan horizontally through approximately 400 mils (22.5°) alternately in two planes P1 and P2 separated in angle by approximately 40 mils (2.25°) at beam centers. This action defines, by the narrow beam locus, two vertically superposed fan-shaped beams, each scanned 20 times per second, hereinafter referred to as the upper and lower beams. This effect is achieved by use of a Foster type scanner SC similar to that disclosed in Foster U.S. Patent No. 2,832,936 issued April 29th, 1958, and modified to provide a dual beam in a manner similar to that described in "Mobile Radar Pinpoints Enemy Mortar Positions"; by M. S. Jaffee et al. "Electronics" Sept. 18, 1959, and, page 34 et seq. The scanner SC is placed at the focus of a semi-parabolic cylindrical reflector RF which produces the two focused beams.

*Antenna construction (FIGURES 2 to 4)*

Figure 2:
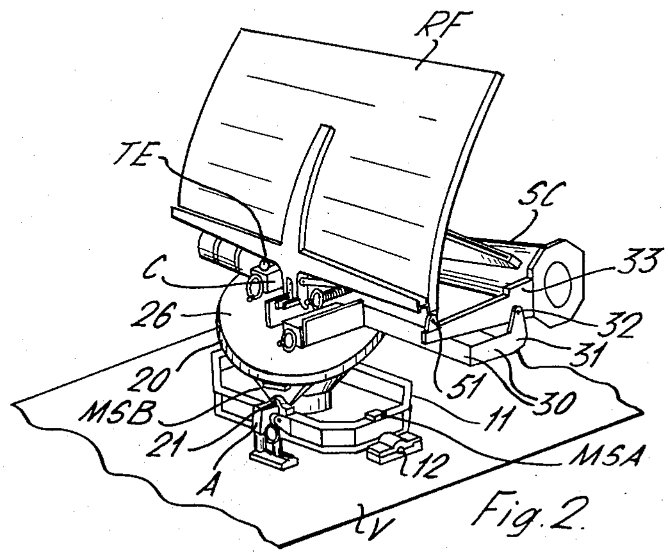
Figure 3:
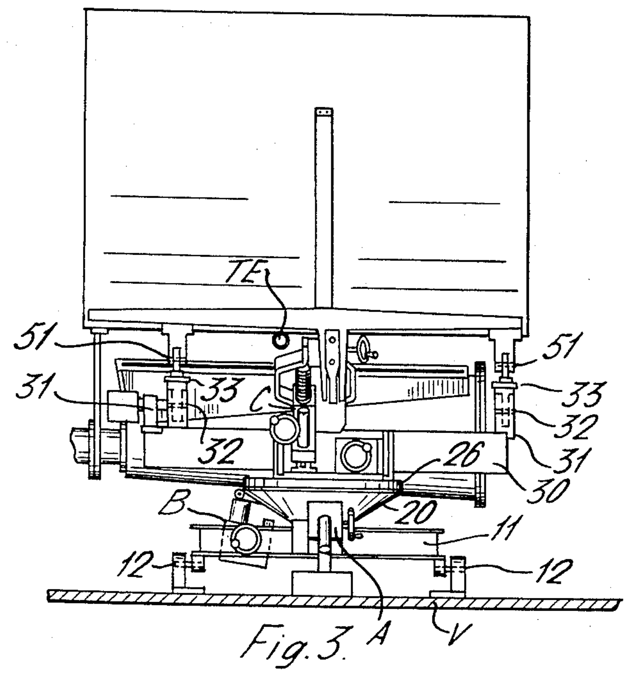

As best seen from FIGURES 2 and 3, the scanner SC and the reflector RF are mounted on the roof of the vehicle V by means of a gimbal-like mounting consisting of a first frame 11 arranged to rotate about an axis-defined by pins 12, and a platform 20 arranged to rotate relative to the frame 11 about pins 21 defining an axis perpendicular to that of the pin 12. Mercury switches MSA and MSB are employed to control respectively an actuator A for tilting the frame 11 relative to the vehicle roof, and an actuator B for rotating the platform 20 relative to the frame 11. These mercury switches maintain the platform 20 horizontal at all times regardless of the attitude of the vehicle V by means of suitable control circuits. These circuits form no part of the present invention and will not be further discussed. Details of the construction of the antenna assembly and an example of control circuits for the automatic levelling thereof are contained in Clemence et al. United States patent application Serial No. 269,363 filed April 1, 1963.

The platform 20 carries a turntable 26 which can be rotated on the platform 20 about a central vertical axis by a motor (not shown). In this way the antenna array is rotated in azimuth to provide complete radar coverage through 6,400 mils (360°).

Mounted on the turntable 26 is a transverse girder 30 formed at each end with an upstanding bearing 31 carrying a pin 32. The pins 32 define a horizontal axis about which antenna frame members 33 rotate under the control of a third actuator C. Frame members 33 carry the scanner SC as well as the reflector RF. The reflector RF is capable of being lowered to a stowage position by rotation about further pins 51, but this is a movement with which the present specification is not concerned. Mounted beneath the bottom edge of the reflector RF so as to look along the center line of the lower beam is a telescope TE. When actuator C is extended or retracted to vary the angle of sight of a whole antenna array, the angle of sight of the lower beam and of the telescope remain equal to each other at all times. This angle related to the horizontal is designated $\theta$ in FIGURE 5. The angle, designated $\alpha$, between the upper and lower beams remains fixed by the dimensions of the antenna array and is thus independent of angle $\theta$.

FIGURE 4 shows the field of view in the eye piece of the telescope TE. Cross wires 40 are lined up with the lower beam so that their point of intersections 41 looks directly along the center of the lower beam in both dimensions. Line 42 represents a movable graticule under the control of knob 43. The point AB marks the point of air burst of a projectile, with which point the graticule 42 has been aligned by an operator for a purpose which will become clear from the description below. Knob 43 is connected by a shaft H43 to a synchro transmitter 44 for transmitting the position of knob 43 and hence of graticule 42 electrically to a synchro receiver 45 and hence via shaft H45 to a repeater in the form of an indicating pointer 14 situated at the control panel of the system inside the vehicle V.

*Mathematics of the computations to be made (FIGURE 5)*

Before considering the detailed nature of the display which appears on the radar screen as a result of a projectile passing through the upper and lower beams, it is necessary to consider the mathematics of the problem, taking as a first assumption that the echoes received from each beam can be resolved into a single point on the trajectory T of the projectile, the range and azimuth of which point (intercept) thus become known. The angle of sight $\theta$ of the lower beam to the horizontal is known by the setting applied to the antenna array over which the operator has control.

FIGURE 5 shows two intercept points *a* and *b* on trajectory T determined by the radar system RD at ranges R1 and R2 respectively. The angle $\phi$ represents the difference between the horizontal plane HP through the radar system RD, and the working plane WP which is the plane in which both the radar system RD and the target point lie. When the radar system is being used to determine the position of an enemy mortar M′, the working plane is set to pass from the radar system RD through such point M′. When the system is being used to detect the position of an air burst AB, the working plane must be effectively moved up to a new position WP′ subtending a new angle $\phi'$ with the horizontal plane HP at the radar RD. The working plane, by definition, always passes through the target point.

It can be shown that the true target position in polar coordinates from the radar system RD, where R*m* is the target range and A*m* is the angle between North and the line of sight of the target are given by equations $$Rm=R1+K'\left[\Delta R+\alpha\left(\theta+\frac{\alpha}{2}\right)Rm\right. \qquad (1)$$

and $$Am=A1+K'\Delta A \qquad (2)$$

where $$K'=K-Q$$

$$K=\frac{\theta+\phi}{\alpha}$$

and $$Q=\frac{g(K'+\frac{1}{2})^2\Delta T^2}{2\alpha Rm}$$

Therefore $$K'=\frac{\theta+\phi}{\alpha}-\frac{g(K'+\frac{1}{2})^2\Delta T^2}{2\alpha Rm} \qquad (3)$$

where $\Delta R=R1-R2$, and $\Delta A=A1-A2$, A1 and A2 being the azimuth angles respectively of points *a* and *b*. ΔT is the time of flight of the projectile between intercept points *a* and *b*, and *g* is the gravitational constant.

The manner of derivation of these equations is explained in full in the above mentioned prior United States patent application Serial No. 269,367, and it is believed unnecessary to repeat their derivation in this specification.

A computer is provided to solve these equations, as is explained below. The target position in polar coordinates R*m* and A*m* can be converted to rectangular (Cartesian) coordinates by means of a resolver the output of which is $Rm \sin Am$ and $Rm \cos Am$.

Besides determining the position of the target point in plan, the computer will provide an elevation of this position. The elevation of the target position relative to the radar is $Rm \sin \phi$. For simplicity, and because $\phi$ is always small, this can be taken as $Rm\phi$.

*Nature of echo presentation and operators procedure (FIGURES 6 and 7)*

Attention is now directed to FIGURES 6*a*, *b* and *c*. FIGURE 6*a* shows a plan view of a typical sector SR scanned by the radar RD. Two composite echo displays E and E′ produced by the lower and upper beams, respectively, are shown. FIGURE 6*b* demonstrates the manner in which the sector SR is presented on the screen S of a B-scope, that is to say a scope which exhibits azimuth along the horizontal axis and range along the vertical axis. After having detected a weapon firing, the operator will enlarge the critical area of the sweep as demonstrated by FIGURE 6*c*.

The echo displays actually received in practice are more complex than those illustrated in FIGURES 6*a*, *b* and *c*, and attention is now transferred to FIGURES 7*a* to *f* for a more detailed discussion of the nature of the display on the screen actually observed by the operator.

As a projectile enters the filed of scan of the lower beam, an echo E1 is displayed on the screen S by a group of individual signal returns resulting from a single passage of the narrow beam across the projectile. The center of the leading (lower) edge of this echo (point C1) represents the true position of the object (projectile) being observed. As the beam continues to sweep, a series of such echoes appears on the screen S. These echoes are indicated as E1 to E5 in FIGURE 7*b* and make up the composite echo E of FIGURES 6*a* to *c*. In reality there may be many more than five individual echoes in this series. Echoes E1 to E4 are shown in broken lines because some fading will have taken place by the time the last echo E5 appears. The duty of the operator is to observe or mark the center points C1 and C5 of the leading edges of the first and last echoes and to estimate the means point CML between these two extreme center points. The screen S is provided with an outer surface that can readily be marked by the operator using a suitable stylus. He may mark points C1 and C5 on the screen as echoes E1 and E5 appear, and then estimate and mark the mean point CML, but an experienced operator will be able to estimate quite closely the mean point CML and mark it on the screen merely by observation of the series of echoes, without finding it necessary to go through the preliminary stage of actually marking points C1 and C5. The vital point to obtain as accurately as possible for the purposes of subsequent operation of the computer is the mean point CML of the centres of he leading edges of the series of echoes LR resulting from the lower beam LB.

Figure 7A:
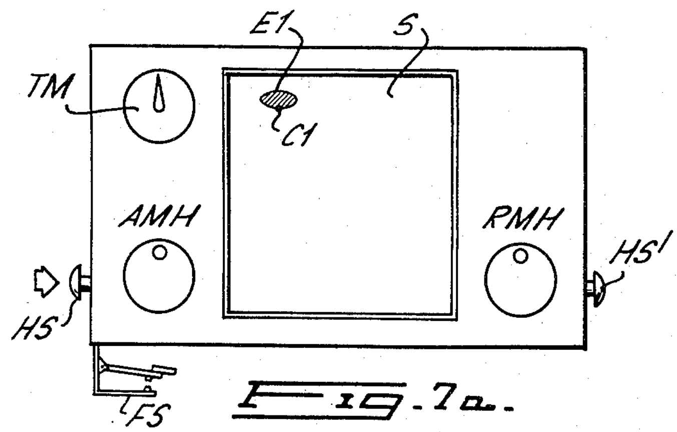
Figure 7B:
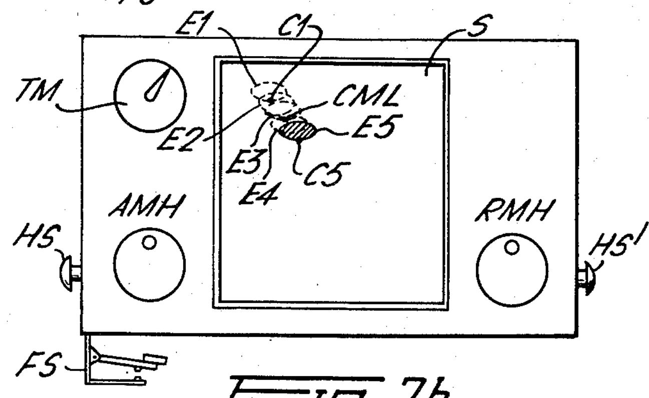
Figure 7C:
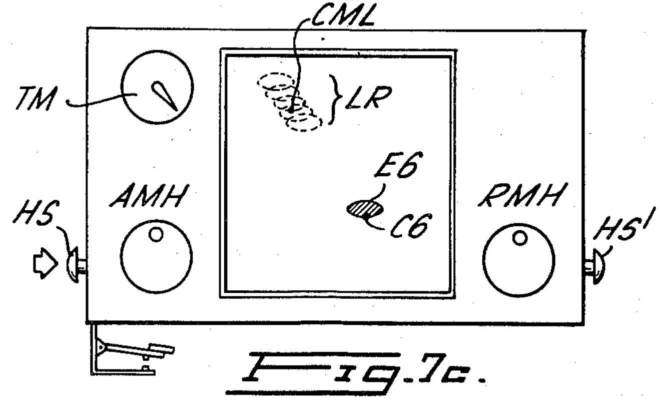
Figure 7D:
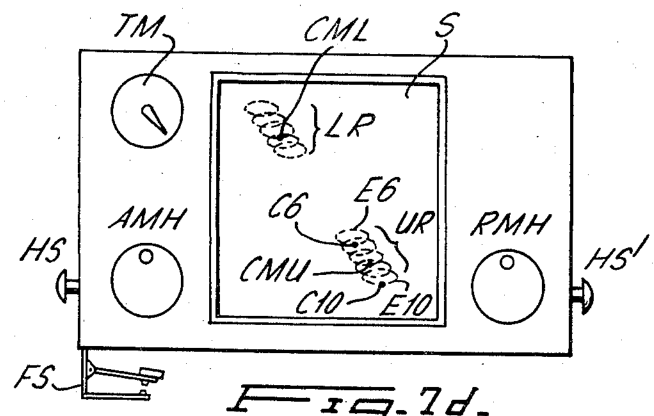

Assuming that the mortar is firing from left to right and towards the radar system RD, the second series of echoes UR detected by the upper beam UB and shown as composite echo E′ in FIGURES 6*a* to *c* appears first as an echo E6 (FIGURE 7*c*) and continues down to echo E10 (FIGURE 7*d*). These echoes of the second series will similarly have leading edge center points C6 to C10, the mean point of which is designated CMU. The upper beam echoes will appear in a lower position on the screen S than the lower beam echoes when the mortar is firing towards the radar, since the range will have shortened somewhat by the time the projectile reaches the upper beam.

Thus, by the time all the echoes have faded from the screen S, the operator will have marked at least the points CML and CMU, which points represent the mean positions of the projectile as it passed through the lower and upper beams respectively. It has been found in practice that a skilled operator can assess the positions CML and CMU to an acceptable degree of accuracy even though estimating these points requires visual and manual dexterity.

As well as carrying out the functions just described, the operator will time the interval the projectile takes to pass from the lower to the upper beam. He can do this either by comparing the first echo of each beam, the last echo of each beam or any pair of corresponding points on the two beams. It has been assumed in FIGURES 7 that he uses the first method and records the time between the respective first echoes E1 and E6 of the lower and upper echo series LR and UR. For this purpose, the operator will push the switch HS with his left hand, to leave his right hand free for marking the screen S. A second, parallel operating, hand switch HS' is provided for left-handed operators. As FIGURE 7*a* indicates by an arrow, the operator will push in the switch HS immediately on appearances of the first echo E1 of the lower beam. This operation will start the timer TM. When the first echo E6 of the upper beam appears (FIGURE 7*c*) the operator will again push the hand switch HS to stop timer TM which will now remain in its new position indicating ΔT, the time of travel from the lower to the upper beam by the projectile.

Figure 7E:
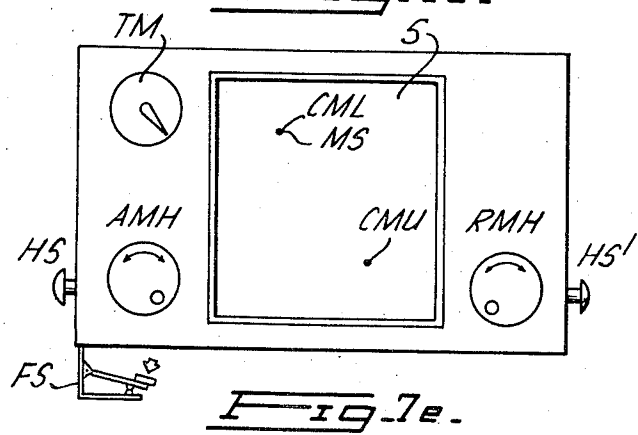
Figure 7F:
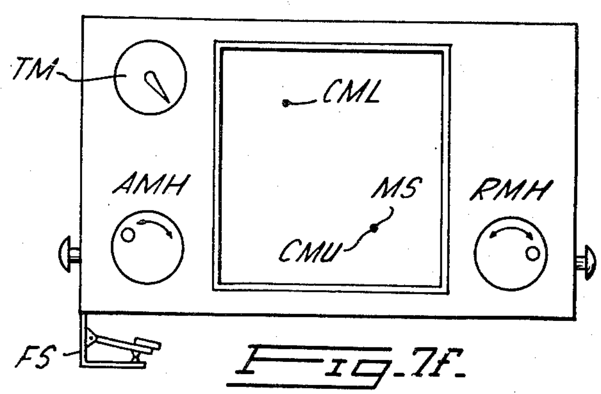

As FIGURE 7*e* demonstrates, the operator is left, after passage of a projectile, with two points CML and CMU marked on his screen S, and ΔT recorded in the timer TM.

The screen S is also provided with a marker spot MS which is an electronic marker produced by conventional circuitry in the radar transmitter-receiver combination and synchronized with the scope sweep so as to occupy a single desired position on the screen S determined horizontally by an azimuth marker handwheel AMH and vertically by a range marker handwheel RMH. Reference may be made to E. F. V. Robinson, Canadian Patent No. 580,247, issued July 28, 1959, for a description of a system for achieving this result. The operator first moves the marker spot MS by means of the handwheels AMH and RMH to coincide with the point CML and when he has achieved this coincidence he presses a foot switch FS (FIGURE 7*e*). Depression of switch FS brings the computer into full operation, as will appear in more detail below. Although illustrated simply, the switch FS is a toggle switch of the type commonly employed to raise and lower the headlights of an automobile, that is to say a switch which remains in each acquired position until reactivated by a further depression of the operator's foot to be reversed. As demonstrated by FIGURE 7*f*, after closing switch FS the operator moves the market spot MS with handwheels AMH and RMH to the point CMU, while switch FS remains closed. In this way, the operator feeds into the computer the difference in range ΔR and the difference in azimuth ΔA between these two points.

*Operation of the computer (FIGURES 8 to 12)*

For an understanding of the manner in which the target point is calcuated from the information available, reference will now be made to FIGURES 8 to 12.

FIGURE 8 shows as a single block RDR a radar transmitter and receiver assembly with related circuits for the B-scope and the electronic marker spot MS. These circuits are conventional and their particular nature forms no part of the present invention. Assembly RDR is coupled electrically and mechanically to the antenna ANT comprising the scanner-reflector assembly already described.

The computer portion of the circuitry which the remainder of FIGURE 8 illustrates in general layout can conveniently be roughly divided into portions which deal respectively with range, elevation, azimuth and information display. These circuit portions are treated separately and in more detail in FIGURES 9, 10, 11 and 12 respectively. Although these circuits are interrelated sufficiently to require some reference to each other in understanding, the description which follows will, as far as possible, take each circuit separately and examine its composition and function. (In all these circuit diagrams, broken lines signify mechanical connection, full lines electrical connection.)

*The range circuit portion (FIGURE 9)*

The range marker handwheel RMH previously described in connection with FIGURE 7 controls movement of the marker spot MS on the screen S in the range direction through a goniometer assembly G1 to which its rotation is transmitted by shaft H1. Goniometer assembly G1 controls the range position of the marker spot MS on the screen. It also, through shaft H4, operates a cam CAM7 which controls a pulse repetition frequency switch PRFS. This switch changes over the radar system from short to long range.

Figure 9:
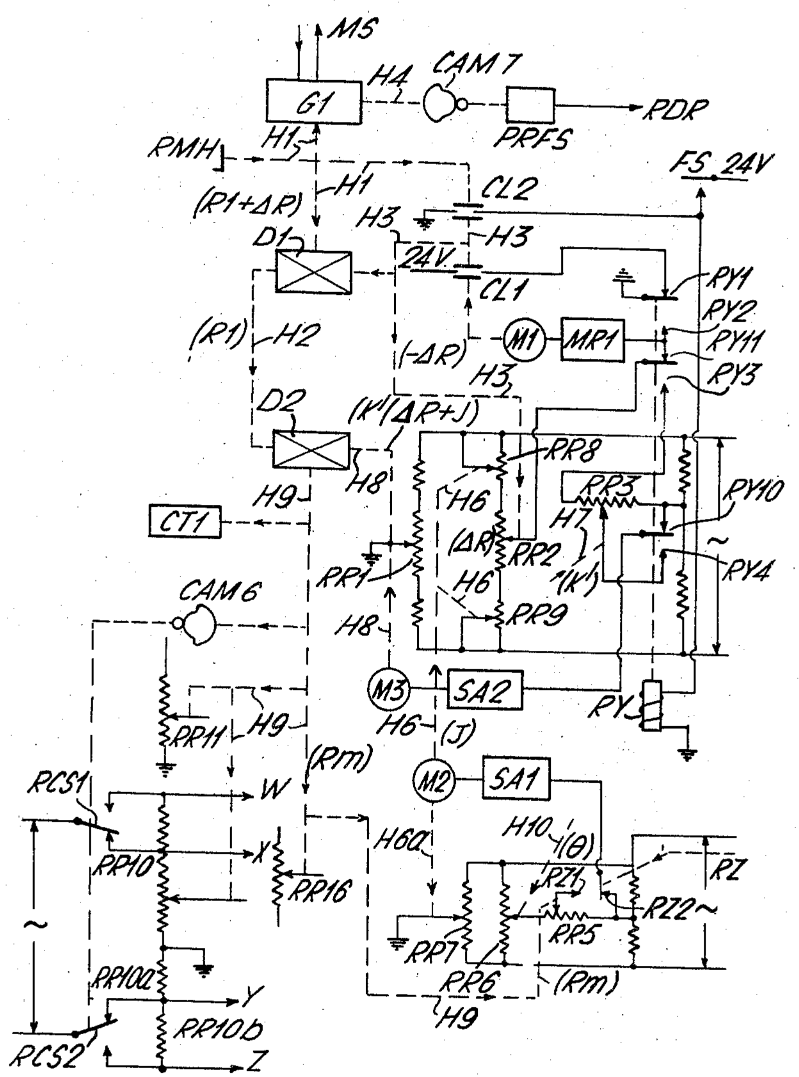
FIGURE 9 is a more detailed illustration of the portion of the circuit of FIGURE 8 principally concerned with calculating the range of the target point.

At the same time the handwheel motion is transmitted by shaft H1 to a first input of a mechanical differential D1. Thus, when the marker spot MS is moved to the point CML in FIGURE 7*a*, the range R1 of such point is fed into the differential D1. As already explained, once the marker spot MS has been aligned with point CML, the operator operates foot switch FS which remains closed. As shown in FIGURE 9, foot switch FS serves to energize a mechanical clutch CL2 which now connects the shaft H1 of the handwheel RMH to shaft H3 which forms another input to differential D1 acting in opposition to shaft H1. As a result, when the marker spot MS is moved by the operator towards point CMU (FIGURE 7*f*) the output of differential D1, shaft H2, remains stationary, since ΔR (the range difference between points CML and CMU) is being inserted twice in opposite senses into differential D1. The position of shaft H2 represents the range value R1, while shaft H3 is moved a distance equal to −ΔR.

Foot switch FS energizes relay RY, one pair of contacts RY1 of which is opened to de-energize a clutch CL1 which had hitherto been holding shaft H3 under the control of a motor M1. Contacts RY2 which are closed by energization of the relay RY serve to ground the input to a motor return amplifier MR1 de-energizing motor M1. The zeroing function of this motor M1 will be described below in connection with the resetting of the system.

The factor −ΔR is transmitted by shaft H3 to a movable slider on a resistor RR2. This part of the circuit is concerned with simulating Equation 1 above, which for convenience is here repeated.

$$Rm=R1+K'\left[\Delta R+\alpha\left(\theta+\frac{\alpha}{2}\right)Rm\right] \qquad (1)$$

If the last term is called J, this equation becomes $$Rm=R1+K'(\Delta R+J) \qquad (1a)$$

And if numerical values are inserted, this equation becomes $$Rm=R1+K'\left[\Delta R+\frac{(\theta+20)Rm}{25{,}840}\right] \qquad (1b)$$

The factor J is added to ΔR by means of resistors RR8 and RR9 arranged in series with resistor RR2. Resistors RR8 and RR9 each have a movable slider controlled through a shaft H6 by a motor M2 which is made to turn by an amount representing the factor J, as will now be explained. By definition J is equal to the angle of sight $\theta$ plus a constant, multiplied by the range R*m*, all divided by a further constant. The range R*m* is inserted by a shaft H9 controlling a slider on a resistor RR5, and $\theta$ (the angle of sight) is inserted by a shaft H10 controlling a slider on a resistor RR6. The constant is added to $\theta$ by choice of the initial position. Movement of shaft H10 is controlled by the elevation circuit portion shown in FIGURE 10 and described below. A relay RZ shown in FIGURE 10 controls contacts RZ1 and RZ2 to close the former and open the latter after hand switch HS and foot switch FS have been actuated. Closure of contacts RZ1 connects the resistor RR5 to the input of a servo-amplifier SA1 to impose thereon a voltage representative of the product of the positions of the sliders on resistors RR5 and RR6, namely $Rm(\theta+a$ constant). Servo-amplifier SA1 energizes motor M2 to drive its shaft H6*a* to reorient the position of a grounded slider on a resistor RR7 in such a way as to restore the input to the amplifier SA1 to zero. This servo-loop thus maintains the shaft H6 at all times at a position representative of the function J, the constant in the denominator of this expression being provided by the mechanical ratio between shafts H6 and H6*a*.

As noted above, shaft H6 is connected to the movable sliders on resistors RR8 and RR9 whereby the combination of these resistors with resistor RR2 generates the function $\Delta R+J$.

It is now necessary to form the product of such latter function and the function K'. The function K' is inserted into the system of FIGURE 9 at the slider of a resistor RR3 by a shaft H7 the position of which is controlled in the manner subsequently described in connection with FIGURE 10. Resistor RR3 is series connected with the slider on resistor RR2 by contacts RY3 which are closed when relay RY is closed and the resulting product output is connected through closed relay contacts RY4 to a servo-amplifier SA2 which controls a motor M3 the shaft H8 of which moves a grounded slider on a resistor RR1 in a manner to restore the input of amplifier SA2 to zero. These parts thus form a second servo-loop whereby the shaft H8 is maintained at all times in an angular position corresponding to the function $K'(\Delta R+J)$.

A second differential D2 receives input from shafts H2 and H8 to form the sum of R1 and $K'(\Delta R+J)$, which sum is R*m* in accordance with Equation 1*a*. The function R*m* appears at the output of differential D2, shaft H9, to be fed into target range counter CT1 which indicates the target range. Shaft H9 also moves sliders on resistors RR11 and RR16 for reasons that will appear when FIGURE 10 is considered, moves a slider on a resistor RR10 for a reason that will appear when FIGURE 12 is considered, transmits the R*m* function to the slider of resistor RR5 for generation of the J function in the manner already described, and operates a cam CAM6 which actuates range change-over switches RCS1 and RCS2 which change the computer over from short range to long range by altering the supply point of power to resistor RR10 and its preset balancing resistors RR10*a* and RR10*b*.

When foot switch FS is reversed to de-energize relay RY, contacts RY10 close to apply the return signal to servo-amplifier SA2 which causes motor M3 to center the slider on resistor RR1. Contacts RY1 also close to energize clutch CL1 to connect shaft H3 (clutch CL2 now being de-energized) to motor M1 for return to zero position under the control of motor return amplifier MR1 which is now connected through contacts RY11 to the slider of resistor RR2. The slider of this ΔR resistor RR2 is thus returned to center position through the zeroing of shaft H3. Contacts RY4 cause motor M3 to return the slider of resistor RR1 to center position. These two potentiometers will then remain in this position until a new problem is set in and the foot switch FS is again pressed to close relay RY.

*The elevation circuit portion (FIGURE 10)*

Turning now to FIGURE 10, the angle of sight $\theta$ of the antenna ANT is fed to the computer from a synchro-transmitter ST geared to the antenna. This information concerning the value of $\theta$ is applied to the stator of a control transformer B3 and develops an error voltage in its rotor, which voltage is applied as an input signal to a servo-amplifier SA3 controlling a motor M4, the output shaft H10 of which turns the rotor of control transformer B3 to cancel out the error voltage and thus complete the servo-loop. Shaft H10 also controls the slider on resistor RR6 as already described in FIGURE 9, feeds to an angle of sight indicator I1, and is applied as an input to a differential D3.

As already explained, when the system is being used to locate an enemy weapon on the ground, the operator commences by estimating the working plane WP from a contour map and by setting such estimate of the angle $\phi$ on a working plane handwheel WPH. The shaft H11 of handwheel WPH transmits motion to a working plane indicator I2, as well as to a second input of differential D3 and to the slider of resistor RR15. The output of differential D3 is a shaft H12 which thus represents the factor $(\theta+\phi)$. This factor is passed to an indicator pointer I3 and through a gear GR in order to divide by a constant to derive the factor K which equals $$\frac{\theta+\phi}{\alpha}$$

$\alpha$ being the constant. Shaft H12*a* feeds K as in input to another differential D4 where the factor K' is derived by subtracting the function Q from K. See Equation 3 above.

$$K'=K-Q$$
$$=\frac{\theta+\phi}{\alpha}-\frac{g(K'+\frac{1}{2})^2\Delta T^2}{2\alpha Rm}$$

The output of differential D4 (representing K') is applied to shaft H7 which, as already indicated, is fed to the slider of resistor RR3 in FIGURE 9. It is also fed to the slider of a resistor RR21 of the azimuth portion of the circuit to be described in connection with FIGURE 11, and to the slider of a resistor RR12 of a circuit now to be described.

The factor Q applied to differential D4 by shaft H13 is derived in another servo-loop formed as a bridge. The inputs are factor R*m* at resistor RR11 (from FIGURE 9), factor K' at resistor RR12 (which resistor by virtue of additional end turns is made to represent the function $K'+\frac{1}{2}$), and ΔT, the time function, at resistor RR13. (Derivation of factor ΔT will be explained below.) Servo-amplifier SA4 monitors the output of the bridge and controls a motor M5 to restore equilibrium by movement of the slider of a resistor RR14 forming the fourth arm of the bridge. The position of motor M5 is also transmitted by shaft H13 to differential D4. The resistors RR12 and RR13 at which factors $K'+\frac{1}{2}$ and ΔT are inserted are wound as square law potentiometers. Resistors RR11 and RR14 are linear. By appropriate adjustment of the constants, the factor Q is obtained at shaft H13 equal to $$125\frac{(K'+\frac{1}{2})^2\Delta T^2}{Rm}$$

Servo-amplifier SA4 is cam controlled through contacts CC1 from the ΔT circuit, so that this servo-loop can only function when ΔT has been set into the computer.

The ΔT circuit (FIGURE 10) operates as follows. Motor M6 is a continuously running synchronous motor and its shaft H14 can be connected to shaft H15 controlling resistor RR13 and cams CAM1 and CAM2 by means of a clutch CL3. Clutch CL3 is energized through contacts RX1 of a latch relay RX controlled by hand switches HS and HS' previously described in connection with FIGURE 7*a*. The relay RX is of a type which latches alternately in and out upon subsequent energizations. Upon being latched in by initial actuation of say switch HS as demonstrated in FIGURE 7*a*, contacts RX1 are closed to energize clutch CL3 and transmit the rotation of the motor M6 to shaft H15 thus beginning to count the factor ΔT on timer TM. Indicating lamp LP2 is de-energized at this time by opening of contacts RX2.

As soon as shaft H15 starts to turn, cam CAM1 closes contacts CC1 to permit the servo-loop of servo-amplifier SA4 to operate, and cam CAM2 opens its contacts CC2 and closes its contacts CC3. Assuming that hand switch HS or HS' is again actuated by the operator before cams CAM1 and CAM2 and timer TM have completed one full rotation (as in FIGURE 7*c*), contacts CC1, CC2 and CC3 remain in their new positions when, upon the second closing of switch HS or HS', the relay RX is returned to its initial position to de-energize clutch CL3 and leave shaft H15 in the position is has acquired representing the factor ΔT. With this ΔT information thus stored in shaft H15, as soon as the foot switch FS is closed (FIGURE 7e) a circuit is completed through closed contacts CC3 to energize a relay RZ which closes contacts RZ1 and opens contacts RZ2 in the circuit generating the J function (see FIGURE 9). At the same time indicating lamp LP1 is lit. In this way the J function can only be applied when the ΔT factor has been set in and the foot switch FS is in the actuated position. However, if the projectile is known to be of the type having a straight line trajectory such as a self-propelled rocket, it is possible to retain the J function while removing the Q factor from the equations. This effect is achieved by closing a rocket switch ROC which short circuits the active portion of resistor RR13. The result is an approximately straight line extrapolation, the most appropriate for this type of projectile.

Another part of the circuit shown in FIGURE 10 is that derived from the shaft H11 of the working plane handwheel WPH to control the position of a slider on a resistor position of a slider on a resistor RR15. This part of the circuit is designed to derive the elevation, which is a function of the working plane angle $\phi$ and of the range $Rm$ which is applied by movement of a slider on a resistor RR16 (FIGURE 9). This is another servo-loop consisting of a servo-amplifier SA5 controlling motor M7, the output shaft H17 of which adjusts resistor RR17 to restore the input of amplifier SA5 to zero while the output from shaft H17 is also fed to another differential D5. The known elevation of the radar system is applied at radar elevation handwheel RLH and is fed by shaft H16 to appear directly in counter CT3 while being added in differential D5 to the difference in elevation between the radar system and the target, $Rm\phi$, as determined by the chosen working plane, to give the elevation of the target in shaft H5 and counter CT4.

In operation to locate an enemy weapon, once the operator has a first reading of the target point, he checks to see if the elevation appearing in counter CT4 agrees with the elevation shown on his map of the target location. If it does not, he turns the working plane handwheel WPH until the counter CT4 shows the elevation given by the map at the target location as determined by the computer. This adjustment is automatically applied to all the other dependent variables in the system and a new location is immediately computed. The operator then rechecks the map elevation and makes a further adjustment if necessary (normally only one resetting is required).

*The azimuth circuit portion (FIGURE 11)*

We come now to consideration of the manner of determining azimuth, for which purpose reference should be made to FIGURE 11. Information concerning the antenna azimuth AA is supplied to the computer by an assembly consisting of two synchro-transmitters ST2 and ST3, one geared directly to antenna azimuth rotation and the other (vernier) rotating 15 times per antenna rotation. This synchro information is applied to the stator of respective main and vernier control transformers B4 and B5. Since these rotors are not free to turn, an error voltage is developed in one or both rotors if they are not aligned with the actual antenna position. These error voltages are applied to a signal selector SS which receives inputs from the rotors of both the main and vernier transformers B4 and B5. As soon as the input from the main control transformer B4 is above a specific voltage level then this error signal controls the output of the signal selector SS. When the error signal from transformer B4 drops below this level, i.e. approaches a null, then any signal being developed by the vernier control transformer B5 becomes the controlling voltage and is passed by the signal selector SS. The output of signal selector SS passes to a servo-amplifier SA6, and the servo-loop is completed by a motor M8, the shaft H18 of which is connected to the rotors of transformers B4 and B5. Motor M8 thus drives the control transformers to their correct nulls. Should the main control transformer B4 reach its wrong null, i.e. 3,200 mils out, then the controlling voltage from the vernier control transformer B5 will drive the servo away from this null towards the correct one, so that the system will only stabilize itself on the correct azimuth setting.

Shaft H18 of motor M8 also drives through a differential D6 to appear on an antenna azimuth counter CT5 via shaft H19, which also transmits this motion through a differential D7 to a shaft H20 and a target azimuth counter CT6. An azimuth orient handwheel AOH controls a shaft H21' also feeding into differential D6. In setting up, this handwheel AOH is rotated until the antenna azimuth counter CT5 reads the correct bearing of the center of scan of the antenna to a known target. In this way the antenna azimuth is oriented in respect to a compass bearing such as North. Shaft H21' is then locked by lock LK1.

Shaft H19 also feeds into a further differential D8 which receives a second input from the azimuth marker handwheel $a$MH via shaft H21. The output of differential D8 is recorded in an antenna + marker counter CT7. An azimuth potentiometer AZP controlled by shaft H21 controls the position of the marker spot MS in azimuth on the screen S. In addition to driving differential D8 the azimuth marker handwheel AMH also drives differential D9, a ± marker counter CT8, and one side of a clutch CL4.

Differential D9 may be considered as a storage device. It functions so as to have an output which indicates the position of the marker spot MS at the first intercept point CML. When the marker spot MS is aligned with point CML (FIGURE 7e) the foot switch FS is closed to energize clutch CL4 so that any further motion of the azimuth marker handwheel AMH is applied both directly to differential D9 by shaft H21, and in opposite sign to the same differential through clutch CL4 and shaft H22. Such applications thus subtract from one another. Differential D9 effectively stores the azimuth position of the marker spot MS at the point CML, namely A1, and passes this information on through shaft H23 to differential D10.

Shaft H22 which only starts to turn after foot switch FS closes clutch CL4 thus provides a measure of ΔA, the difference in azimuth, and this function is transmitted to a slider on a resistor RR20 of a further servo-loop designed to provide the multiple K'ΔA. The factor K' is inserted at the slider of resistor RR21 being obtained from shaft H7 of the FIGURE 10 circuit. Resistor RR21 is series connected by contacts RY7 of relay RY (when energized by foot switch FS) with the slider of resistor RR20. The output which traverses now closed contacts RY8 appears at the input of servo-amplifier SA7 to control the position of motor M9 which in turn controls the slider of a resistor RR22 through shaft H25 in a manner to restore the circuit to balance.

The position of shaft H25 then represents the function K'ΔA which is applied at differential D10 to be added to factor A1 and hence transmitted through shaft H24 to be added in differential D7 to the antenna azimuth to provide an output in shaft H20 which represents target azimuth, $Am$. See Equation 2, $Am=A1+K'\Delta A$. This value $Am$ appears in target azimuth counter CT6 and is also fed to a resolver RS shown in more detail in FIGURE 12.

When foot switch FS is reversed to de-energize relay RY, contacts RY9 close to apply the return signal to servo-amplifier SA7 which causes motor M9 to center the slider on resistor RR22. Contacts RY5 also close to energize clutch CL5 to connect shaft H22 (clutch CL4 now being de-energized) to motor M10 for return to zero position under the control of motor return amplifier MR2 which is now connected through contacts RY12 to the slider on resistor RR20. The slider of this ΔA resistor RR20 is thus returned to center position through the zeroing of shaft H22. Contacts RY9 closing causes motor M9 to return the slider of resistor RR22 to center position. These two potentiometers will then remain in this position until a new problem is set in and the foot switch FS is again pressed to close relay RY.

When echoes appear too close to the edge of the screen S, a centering device incorporated in the circuit portion of FIGURE 11 allows the centering of the radar scan on the position of these echoes. The amount and direction of rotation of the antenna may be initially determined by the azimuth marker spot setting or approximated by the operator and set on centering dial CD through shaft H26 by azimuth centering knob ACK. Clutch CL6 and the antenna relays are de-energized while knob ACK is being turned, but operate as soon as torque is removed from the centering knob. Shaft H26 also controls cams CAM3 and CAM4 which respectively operate clockwise antenna rotation switch CWS and counterclockwise antenna rotation switch CCWS. These switches control the antenna ANT so that it will rotate automatically in the direction and the amount set on dial CD.

As a second embodiment of this azimuth centering device (not illustrated), the cams CAM3 and CAM4 are both attached to shaft H21 instead of shaft H20. A suitable clutch arrangement is then provided coupling the antenna azimuth shaft H18 to the shaft H21. A manual switch provides excitation for this clutch arrangement as well as for switches CWS and CCWS which remain mechanically actuated by cams CAM3 and CAM4 to cause the antenna to rotate automatically until the marker spot displacement is removed. This thus constitutes a fully automatic azimuth centering device.

*The information circuit portion (FIGURE 12)*

FIGURE 12 shows the information portion of the system which is provided to convert the target ranges and azimuths to Eastings and Northings. This is accomplished by obtaining a voltage proportional to target range R*m* from resistor RR10 (see also FIGURE 9) and applying this voltage to the stator RSS of the resolver RS through a booster amplifier BA, while the rotor RSR of the resolver RS is rotated in proportion to the target azimuth A*m* obtained from the shaft H20 of FIGURE 11. The outputs of the windings of the resolver rotor RSR are then proportional to $Rm \sin Am$ for Eastings and $Rm$ cosine $Am$ for Northings, such Eastings and Northings being the relative Eastings and Northings of the target in relation to the radar system. Amplifier AR3 and Motor M12 form a servo-loop for the Eastings with an output in shaft H30 which drives a slider on resistor RR30 until its voltage is exactly equal and opposite to that generated in the rotor winding of resolver RS to which such slider is connected. Similarly, amplifier AR2 and motor M13 form a servo-loop for the Northings giving an output in shaft H31 driving the slider of resistor RR31. Resistors RR30 and RR31 are supplied with power from points W, X, Y and Z as indicated from FIGURE 9. A differential D12 driven by shaft H30 has the known radar Eastings applied to it by radar Eastings handwheel REH and shaft H32. A differential D13 driven by shaft H31 has the known radar Northings applied to it by radar Northings handwheel RNH and shaft H34. Absolute radar Eastings appears in counter CT9, while the sum of shafts H30 and H32 appears in shaft H33 as the target Eastings (that is the absolute target Eastings) and is displayed in counter CT10. In a similar manner, absolute radar Northings appears in counter CT11, while the sum of shafts H31 and H34 appears in shaft H35 as the target Northings (that is absolute target Northings) and is displayed in counter CT12. Shafts H32 and H34 are normally clamped by locks LK2 and LK3.

*Manual operation of the system for locating air burst (FIGURES 4 and 10)*

When the radar system is to be used for calibrating (registering) a friendly gun G, for which purpose it is desired to know the exact location of air burst AB, one operator ascends to the roof of the vehicle and the antenna array is oriented so that the angle of sight $\theta$ of the lower beam LB is generally in the direction of and slightly above the expected point of air burst. The operator at the control panel inside the vehicle observes the two series of echoes which he obtains from the upper and lower beam and feeds the information concerning center points CML and CMU, and the time interval $\Delta T$, into the computer in the manner already explained. The operator on the roof of the vehicle observes the air burst AB in the telescope TE and aligns the movable graticule 42 with the burst AB. As indicated in FIGURE 4, this movement of the graticule 42 by the knob 43 is transmitted through the shaft H43 to the synchro transmitter 44, whereby the information is transferred electrically to synchro receiver 45 and conveyed by shaft H45 to indicating pointer I4.

The operator now turns the working plane handwheel WPH (FIGURE 10) until the indicating pointer I3 controlled by shaft H12 is aligned with the pointer I4. The effect of this movement is to bring the working plane WP up to the position WP′ at which it passes through the air burst point AB and the working plane angle $\phi$ becomes $-\phi'$. It will be clear from FIGURE 5 that pointer I4 indicates the function $\Delta\theta$ and that $\Delta\theta$ equals $\theta-(-\phi')=\theta+\phi'$, the angle $\phi$ being assumed positive below the horizontal. This is the relationship set up by alignment of the pointers I3 and I4, since shaft H45 represents $\Delta\theta$ and shaft H12 represents $\theta+\phi$, and hence $\theta+\phi'$. This is equivalent to the equation $-\phi'=\theta-\Delta\theta$.

The solution of the target point coordinates will now emerge from the computer to yield the point AB, which is the desired result.

*Modification to achieve more automatic operation (FIGURE 10a)*

FIGURE 10*a* shows a modified fragment of FIGURE 10. As before, the shaft H10 represents the function $\theta$. A further feed from the synchro-transmitter ST of the antenna ANT is taken to synchro-differential STD, which also receives the function $\Delta\theta$ on shaft H43 from the knob 43 of the telescope TE (FIGURE 4). The electrical output of synchro-differential STD represents the function $\theta-\Delta\theta$ and is fed to a servo loop comprising a synchro receiver SCR and a servo-amplifier SA8 which controls a motor M12 the output of which is now connected to the shaft H11 to be fed back into the synchro receiver SCR in the usual manner of a servo loop. Shaft H11 is still connected to the working plane handwheel WPH, as before, as well as to the indicator I2, the movable tap on resistor RR15 and, as an input, to the differential D3. Shaft H11 still represents the function $\phi$ or $-\phi'$ which instead of being inserted manually by the handwheel WPH is now derived from the equation $$-\phi'=\theta-\Delta\theta$$

Functions $\theta$ and $\phi$ are added as before in differential D3 and applied through shafts H12 and H12*a* to the differential D4.

This automatic system avoids the need for the operator to align pointers I3 and I4 and feeds the computer automatically as soon as the telescope operator aligns the graticule 42 with the burst point AB.

It will be noted that two switches are provided in the power supply to the servo amplifier SA8. The first, a spring-loaded, normally-closed switch S4 is located in the vehicle adjacent the main operator's control panel. He holds this switch open whenever he wants to turn the working plane hand wheel WPH manually to move the working plane up or down the trajectory. Upon release of switch S4, the working plane will be returned automatically to coincide with the line of sight of graticule 42. By thus operating the working plane hand wheel WPH manually the operator is able to move the computed coordinates up or down the trajectory, so that, for any other height at which the projectile could have been fused to burst, the coordinates are indicated in the main computer outputs. The operator may be instructed to set any theoretical elevation of burst in counter CT4 (FIGURE 10) by moving the working plane handwheel WPH, and the corresponding coordinates of such theoretical point on the computed trajectory appear in counters CT1, CT6, CT10 and CT12. The upper limit of this computation coincides with the centre of the lower beam.

Switch S5 is a further spring-loaded, normally-open switch in the power supply to amplifier SA8, switch S5 being located beside the telescope TE. The telescope operator holds switch S5 closed as soon as he has lined up the graticule 42 with the air burst point AB. Prior to that time, it is desired to keep the servo loop controlled by servo amplifier SA8 inactive, since the correct value of $\Delta\theta$ will not yet have been fed into the system through shaft H43.

*Reconsideration of overall system*

Returning to a consideration of FIGURE 8 in the light of the details of FIGURES 9 to 12, it will be observed that each of these figures has been shown as a single block in FIGURE 8, although certain of their parts such as handwheels, counters and shafts have been shown separately for emphasis. FIGURE 8 is intended to illustrate concisely the interrelationship of the circuits of FIGURES 9 to 12, and to show the principal functions that are exchanged mechanically and electrically between these circuits.

The inputs to the computer supplied by the operators are

AMH, the azimuth marker handwheel
RHM, the range marker handwheel
WPH, the working plane handwheel
RLH, the radar elevation handwheel
REH, the radar Eastings handwheel
RNH, the radar Northings handwheel
AOH, the azimuth orient handwheel
$\Delta T$, the time interval between observing the projectile in a like position in the lower and upper beams, and
$\Delta\theta$, the angle the telescope graticule make with the lower beam centre.

The information obtained from the antenna comprises $\theta$, the angle of sight, and
AA, the antenna azimuth.

The principal outputs are in

CT4, the target elevation counter
CT6, the target azimuth counter
CT1, the target range counter
CT10, the target Eastings counter
CT12, the target Northings counter

*Resetting procedure (FIGURES 9 to 11)*

After making an observation and computation as above described, the operator resets the computer by depressing the foot switch FS for a second time to open its contacts and de-energize relays RY and RZ. The $K'\Delta A$ and $K'(\Delta R+J)$ shafts H25 and H8 are returned to zero by motors M9 and M3 as described and the $\Delta R$ and $\Delta A$ shafts H3 and H22 are also returned to zero by motors M1 and M10. The operator again presses his hand switch HS (or HS') to re-energize relay RX and re-engage clutch CL3 so that shaft H15 again starts to turn. Such motion continues until cams CAM1 and CAM2 and timer TM each complete one full revolution. Resistor RR13 similarly completes one excursion (revolution) to return to its zero position. CAM1 opens contacts CC1 which causes servo-amplifier SA4 to operate motor M5 to return the slider of resistor RR14 to zero and then become de-energized. CAM2 opens contacts CC3 and closes contacts CC2. Closing of contacts CC2 completes a circuit through contacts RX3 of relay RX to re-pulse this relay to return it to and latch it in the position in which contacts RX1 and RX3 are open. This opens clutch CL3 to stop shaft H15 with the cams in their zero positions. Now closed contacts CC2 and RX2 relight lamp LP2 to indicate that resetting has occurred.

The system is now in readiness for a new set of values to be fed into it when the operator observes another projectile in flight.

I claim:

1. A radar system comprising
(a) means for emitting two closely vertically superposed, mutually divergent, generally horizontal, effectively continuous, upper and lower radar beams,
(b) means for displaying echoes returned by a projectile travelling in a trajectory intersecting said upper and lower beams and for determining range and azimuth values of such intersections measured from the radar system in relation to a known azimuth datum,
(c) a computer,
(d) means for supplying the computer with said determined range and azimuth values, with the value of the angle ($\theta$) the lower beam makes with the horizontal, with the value of the angle ($\alpha$) between beams and with the value of the angle ($\phi$) a working plane makes with the horizontal,
(e) said computer including means for calculating at least approximately coordinates of a target point on said working plane through which such trajectory extends,
(f) and means for observing the point of burst of a projectile and for setting the computer for a working plane passing through such observed point of burst.

2. A radar system according to claim 1, wherein said last mentioned means comprise
(a) means for measuring the angle $\Delta\theta$ the lower beam makes with a line joining the radar system and the point of burst,
(b) and means for solving the equation $\phi=\theta-\Delta\theta$, and for setting the computer for a working plane having an angle $\phi$ whereby to pass said working plane through the observed point of burst.

3. A radar system according to claim 1, wherein said computer comprises means for solving equations $$Rm=R1+K\Delta R$$

and $$Am=A1+K\Delta A$$

where
Rm and Am are the target range and target azimuth values respectively,
R-1 and A-1 are the range and azimuth values respectively of the intersection by the projectile of the lower beam,
$\Delta R$ and $\Delta A$ are the differences in range and azimuth between the intersections by the projectile of the lower and upper beams, and $$K=\frac{\theta+\phi}{\alpha}$$

4. A radar system according to claim 1, wherein said computer comprises means for solving equations $$Rm=R1+K\left[\Delta R+\alpha\left(\theta+\frac{\alpha}{2}\right)Rm\right]$$

$$Am=A1+K\Delta A$$

where
Rm and Am are the target range and target azimuth values respectively,

R1 and A1 are the range and azimuth values respectively of the intersection by the projectile of the lower beam, ΔR and ΔA are the differences in range and azimuth between the intersections by the projectile of the lower and upper beams, and $$K=\frac{\theta+\phi}{\alpha}$$

5. A radar system according to claim 1, including means for determining the time interval (ΔT) between passage of the projectile through corresponding points of the upper and lower beams, and wherein said computer comprises means for solving equations $$Rm=R1+K'\left[\Delta R+\alpha\left(\theta+\frac{\alpha}{2}\right)Rm\right]$$

$$Am=A1+K'\Delta A$$

$$K'=\frac{\theta+\phi}{\alpha}-\frac{g(K'+\frac{1}{2})^2\Delta T^2}{2\alpha Rm}$$

where

R*m* and A*m* are the target azimuth values respectively

R1 and A1 are the range and azimuth values respectively of the intersection by the projectile of the lower beam, ΔR and ΔA are the differences in range and azimuth between the intersections by the projectile of the lower and upper beams, and

*g* is the gravitational constant.

6. A method of locating the point of burst of a projectile, comprising (*a*) emitting from a radar system two closely vertically superposed, mutually divergent, generally horizontal, effectively continuous, upper and lower radar beams to intersect the trajectory of said projectile, the lower beam lying above said point of burst, (*b*) determining the angle ($\theta$) the lower beam makes with the horizontal, and the angle ($\alpha$) between the upper and lower beams, (*c*) observing the point of burst and determining the angle ($\Delta\theta$) that a working plane extending from the radar system through said point of burst makes with the lower beam, (*d*) determining the angle ($\phi$) made with the horizontal by the working plane from the equation $\phi=\theta-\Delta\theta$, (*e*) displaying on a range-azimuth radar display echoes returned by said projectile during intersection of said upper and lower beams, (*f*) and employing the differences in range and azimuth of the intersections so displayed, together with the values of said angles, to determine coordinates of the point of burst.

7. A method according to claim 6, including the steps of (*a*) deriving the mean point of the leading edges of the series of echoes received for each of said upper and lower beams, (*b*) employing the differences in range and azimuth of the mean points so derived, together with the values of said angles, to solve the equations $$Rm=R1+K\Delta R$$

$$Am=A1+K\Delta A$$

where

R*m* is the target range value of the point of burst from the radar system,

A*m* is the target azimuth value of the point of burst measured from the radar system in relation to a known azimuth datum, R1 is the range value of said mean point for the lower beam, A1 is the azimuth value of said mean point for the lower beam related to said datum, ΔR is the difference in range between said mean points, ΔA is the difference in azimuth between said mean points, and $$K=\frac{\theta+\phi}{\alpha}$$

(*c*) and displaying the values R*m* and A*m*.

8. A method according to claim 6, including the steps of (*a*) deriving the mean point of the leading edges of the series of echoes received for each of said upper and lower beams, (*b*) measuring by observation of said echoes the time interval (ΔT) between the projectile occupying a like position in each of said upper and lower beams, (*c*) employing the differences in range and azimuth of the mean points so derived, together with the values of said angles and said time interval, to solve the equations $$Rm=R1+K'\left[\Delta R+\alpha\left(\theta+\frac{\alpha}{2}\right)Rm\right]$$

$$Am=A1+K^1\Delta A$$

$$K'=\frac{\theta+\phi}{\alpha}-\frac{g(K'+\frac{1}{2})^2\Delta T^2}{2\alpha Rm}$$

where

R*m* is the target range value of the point of burst from the radar system,

A*m* is the target azimuth value of the point of burst measured from the radar system in relation to a known azimuth datum, R1 is the range value of said mean point for the lower beam, A1 is the azimuth value of said mean point for the lower beam related to said datum, ΔR is the difference in range between said mean points, ΔA is the difference in azimuth between said mean points, and

*g* is the gravitational constant, (*h*) and displaying the values R*m* and A*m*.

References Cited by the Examiner

UNITED STATES PATENTS 2,939,134 5/60 Van Atta ------------ 343—7 X

CHESTER L. JUSTUS, *Primary Examiner.*